(No Model.)
O. ZWIETUSCH.
METHOD OF AND APPARATUS FOR COLLECTING WASTE GASES IN BREWERIES.
No. 582,151. Patented May 4, 1897.
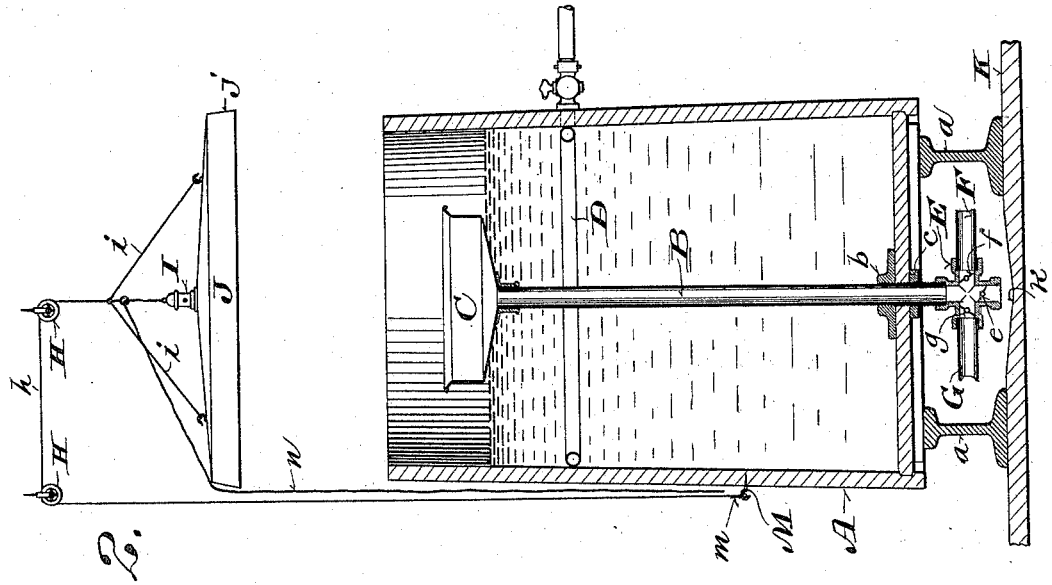
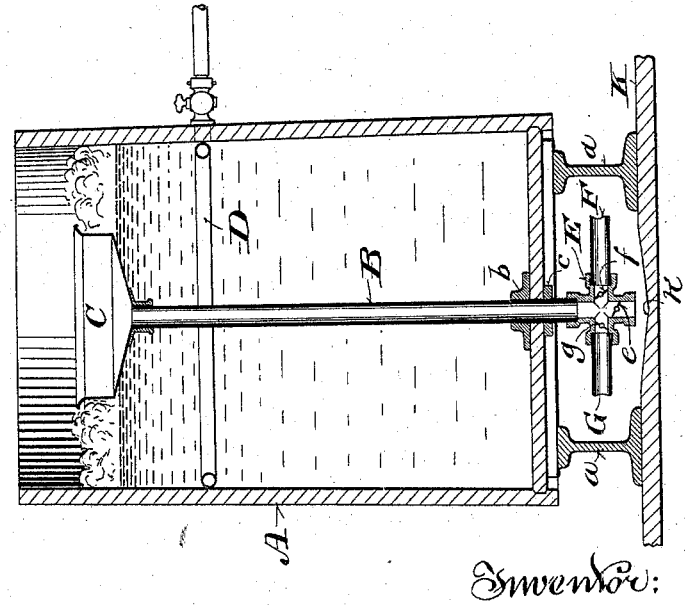

United States Patent Office.

OTTO ZWIETUSCH, OF MILWAUKEE, WISCONSIN.

METHOD OF AND APPARATUS FOR COLLECTING WASTE GASES IN BREWERIES.

SPECIFICATION forming part of Letters Patent No. 582,151, dated May 4, 1897.

Application filed November 19, 1896. Serial No. 612,730. (No model.)

*To all whom it may concern:*

Be it known that I, OTTO ZWIETUSCH, a citizen of the United States, and a resident of Milwaukee, in the county of Milwaukee and State of Wisconsin, have invented certain new and useful Improvements in the Method of and Apparatus for the Collection of Waste Gaseous Products in Breweries; and I do hereby declare that the following is a full, clear, and exact description thereof.

My invention relates to the collection of the waste carbonic-acid gas from open fermenting-vats during the main fermentation in breweries; and it consists in certain improvements in the method and apparatus for accomplishing this result, as will be more fully set forth hereinafter and subsequently claimed.

In the drawings, Figure 1 is a vertical sectional view of an open fermenting-vat embodying my present invention in part; and Fig. 2 is a like view of said vat, showing also a suspended cover which is used in connection therewith periodically in carrying out my present method.

At the present time the fermentation is usually carried on in the following way: After the wort is brewed and cooled it is conveyed to a settling-tank, in which the stock-yeast is added. After settlement of the turbidness and after a lively fermentation has set in the wort is led into open fermenting-vats, where it remains until the main fermentation is over. To produce a good and sound fermentation, the presence of clear and fresh atmospheric air is required, and in order to prevent a high layer of carbonic-acid gas upon the liquid undergoing fermentation, by which the latter is hampered, the vats are filled as high as possible to allow the gas to frequently pass off over the walls of the same. When the fermentation is in a lively condition, hop-tar will settle on the top of the liquid in the vat and must be skimmed off. The carbonic-acid gas soon rises and flows over the walls of the fermenting-vats and mingles with the air in the fermenting-room, often to such an extent that the air becomes heavily saturated with the gas, which hinders the fermentation, besides being exceedingly offensive and difficult to breathe. This is a very serious objection, and it is difficult to get this impure air out of the fermenting-room, besides which the fresh air entering the room requires an additional cooling.

In order to obviate these objections, various attempts have been made from time to time to carry on the main fermentation in closed vats and draw off the carbonic-acid gas therefrom, so as to preserve a clear atmospheric air in the fermenting-room; but this has not been entirely practicable, because, in the first place, the process of fermentation cannot be satisfactorily examined with the closed vats, and, further, the atmospheric air, which is so valuable for the proper fermentation, especially in the beginning, is excluded from the closed vats, and, finally, the hop-tar, &c., which forms on the top of the fermenting liquid cannot be properly skimmed off without opening the closed fermenting-vats. These objections are so serious that brewers are generally going back to the use of the old open vats despite the disadvantages attending their use already cited.

By my present invention I overcome all of the hereinbefore-recited objections to both the open and closed vats.

Referring to the drawings, A represents an open fermenting-vat resting on suitable supports *a a* above the floor K of the fermenting-room.

B is a vertical pipe passing through the center of the bottom of the vat A.

C is a basin or pan secured to the upper end of the pipe B, said basin having a centrally-inclined bottom and vertical sides or upright walls of sufficient height to prevent the foam and yeast arising from the fermenting liquid from passing over and into the basin, and hence the sides or walls of this basin must extend several inches above the level of said liquid. The upright walls of the fermenting-vats A must in turn extend a considerable height above the level of the top of the basin, so that as the carbonic-acid gas rises in the vat, instead of flowing over the wall of the vat, it will flow over the wall of the central basin.

D represents the cooling-pipe (filled with brine from the refrigerating device, not shown) to keep the fermenting liquid at the required degree of temperature.

E is a three-way outlet secured to the lower projecting end of the pipe B below the bottom of the vat and supplied with three butterfly-valves or cut-offs $e\,f\,g$.

F G are pipes leading from the horizontal arms of the outlet E to separate reservoirs or receptacles (not shown) for the reception of the gas, as hereinafter explained, said pipes being controlled by the said valves or cut-offs $f\,g$, respectively. The lower vertical arm of the outlet E is always closed by the valve or cut-off $e$ during the collection of the gas either through pipe F or G and is always open at other times and is located just above a channel $k$ in the floor K, which latter is preferably formed of cement, and said channel leads to a sewer.

In the beginning of the main fermentation the carbonic-acid gas which rises from the fermenting liquid is largely mixed with air, and as this gas flows into the described central collecting-basin C it passes down through the pipe B, and one of the valves or cut-offs (say $f$) is opened, so that this gas is led through the pipe F, that connects with one of the described reservoirs, to be subsequently used for compelling and counter-pressures in place of ordinary compressed air. When the gas begins to be freer of air at a later stage of the fermentation, it is desirable to save this and store it separately for subsequent purification and use in carbonating and finishing the beer, and to prevent this clearer gas from being mixed with the outside air I employ the closing device shown in Fig. 2, which I will next describe.

J is a cover of light metal whose top slopes or inclines from the center to the edge and which has a downwardly-inclined edge flange $j$, so that when said cover is lowered it will fit over the top of the vat A and practically close it, though not hermetically. The cover is suspended by cords $h\,i\,i$ above the vat A, said cord $h$ passing over pulleys H H, and thence down alongside the vat A, said cord having preferably a loop or ring $m$ for engagement with a hook or projection M on the vat, so as to keep the said cover in a normally-suspended condition.

I is a valved air-vent at the center of the top of the cover J, and when the said cover has been lowered so as to close the vat the valve of this air-vent I may be opened (as by cord $n$) and any air in the top of the vat A allowed to escape, when the said valve is permitted to close. I have described a gravity-valve, but any form of air cock or vent may be employed. The valve or cut-off $g$ is now opened, (the other valves $e\,f$ being closed,) and the gas that now is collected in the basin C will move down through the pipe B, and thence pass through the pipe G into the other receptacle referred to.

The fact that there is no hermetic sealing of the vat will not interfere, because the outside atmospheric air will not enter through any slight opening that may exist on account of the pressure of the carbonic-acid gas, which accumulates rapidly and fills the top of the vat as fast as it escapes down the pipe B, and while there will be a slight pressure of this gas upon the fermenting liquid the gas escapes too readily and freely to cause any heavy layer thereof to rest upon the said liquid. After this clearer gas has been collected the cover J is raised again, so as to again freely admit the atmospheric air until the main fermentation is completed. At night it is desirable to allow a free and uninterrupted outflow of the gas, and hence the valve $e$ is opened, thereby preventing the layer of gas on the fermenting liquid, and as said gas is carried off through the described floor-channel $k$ the air in the fermenting-room is kept pure and fresh.

The pipe B is screw-threaded where it passes through the bottom of the vat and is secured by a metal screw-threaded flange $b$ above and a nut $c$ below said bottom, the flange $b$ being preferably made fast to the bottom, as by screws. When it is desired to clean the said vertical pipe B and basin C, the latter is thoroughly scrubbed, and then water is introduced into the said basin, and the lower butterfly valve or cut-off $e$ is opened, so that the water will run through the said pipe and into the channel $k$ of the floor K, and thence be carried off to the sewer.

The described basin or pan C is of further advantage in that its upper edge affords a continuous guide for the skimming-spoon, thereby guarding against dipping the spoon too deeply in the fermenting liquid, which is liable to occur in an ordinary open vat and which results in mixing the hop-tar and other impurities being skimmed off with the fermenting wort.

Having thus described my invention, what I claim as new, and desire to secure by Letters Patent, is—

1. The combination with an open fermenting-vat, of a central vertical pipe passing through the bottom of said vat, a collecting-basin secured to the top of said pipe and having its upper edges intermediate between the level of the fermenting liquid in said vat and the top of the upright walls of said vat, a three-way outlet secured to the lower projecting end of the said central vertical pipe below the bottom of the vat, butterfly-valves or cut-offs, one in each horizontal arm and one in the lower vertical arm of said outlet, and horizontal gas-leading pipes connected to the said horizontal arms of said outlet, substantially as set forth.

2. The herein-described method of collecting the carbonic-acid gas arising during the main fermentation in breweries, consisting in carrying off the gas from above the fermenting-surface through a downward-leading gas-collector and a gas-leading pipe to a suitable receptacle, with the top of said vat open, then closing the top of said vat and carrying off the gas through the same collector and another gas-leading pipe to another receptacle, and then opening the top of the vat to the atmospheric air, and carrying off the gas through the same collector until the end of the main fermentation.

In testimony that I claim the foregoing I have hereunto set my hand, at Milwaukee, in the county of Milwaukee and State of Wisconsin, in the presence of two witnesses.

OTTO ZWIETUSCH.

Witnesses:
H. G. UNDERWOOD,
B. C. ROLOFF.